United States Patent [19]

Morgan, Jr. et al.

[11] Patent Number: 5,251,776
[45] Date of Patent: Oct. 12, 1993

[54] PRESSURE VESSEL

[75] Inventors: H. William Morgan, Jr., P.O. Box 735, Michigan City, Ind. 46360; James D. Hall, Cassopolis, Mich.

[73] Assignee: H. William Morgan, Jr., Michigan City, Ind.

[21] Appl. No.: 743,673

[22] Filed: Aug. 12, 1991

[51] Int. Cl.⁵ .................... B65D 51/16; B65D 41/06
[52] U.S. Cl. .................. 220/360; 220/206; 220/300; 220/307; 220/366; 215/307
[58] Field of Search ............. 220/231, 240, 300, 303, 220/307, 316, 360, 366, 202, 206, 208, 361, 661, 676; 215/262, 307, 310

[56] References Cited

U.S. PATENT DOCUMENTS

| | | | |
|---|---|---|---|
| 649,843 | 5/1900 | Honiss | 215/311 X |
| 1,095,922 | 5/1914 | Parry | 215/263 |
| 1,732,235 | 10/1929 | Joyce | 220/240 |
| 2,177,123 | 10/1939 | Wittenberg | 220/300 |
| 2,333,890 | 11/1943 | Russell | 220/300 |
| 2,534,164 | 12/1950 | Finch | 220/303 |
| 2,593,770 | 4/1952 | Kollsman | 220/316 X |
| 2,636,634 | 4/1953 | Flubacker | 220/300 |
| 3,897,874 | 8/1975 | Coons | 215/352 X |
| 3,990,605 | 11/1976 | Hanke et al. | 220/316 |
| 4,007,848 | 2/1976 | Snyder | 215/307 X |
| 4,574,988 | 3/1986 | Karliner | 220/316 X |
| 4,589,566 | 5/1986 | Rives et al. | 220/316 |
| 4,733,795 | 3/1988 | Boehm | 220/316 |
| 4,741,260 | 5/1988 | Bolivar | 220/316 X |
| 4,815,627 | 3/1989 | Marshall | 220/316 X |
| 5,050,778 | 9/1991 | Corrado et al. | 220/316 X |

FOREIGN PATENT DOCUMENTS 2358746  5/1974  Fed. Rep. of Germany ...... 220/316

Primary Examiner—Stephen Marcus
Assistant Examiner—Vanessa Caretto
Attorney, Agent, or Firm—James D. Hall

[57] ABSTRACT

A pressure vessel including a lid with integral fixed lock tabs engageable with notches in the housing side wall to secure the lid to the housing. The housing includes a vent opening formed through the side wall. The lower edge of the lid is substantially bevelled and has a flattened portion to seal the vent when the lid is in its closed position. On opening of the lid, the seal between the vent and lid is broken before the fingers disengage the housing to vent residual pressure from within the housing.

5 Claims, 2 Drawing Sheets

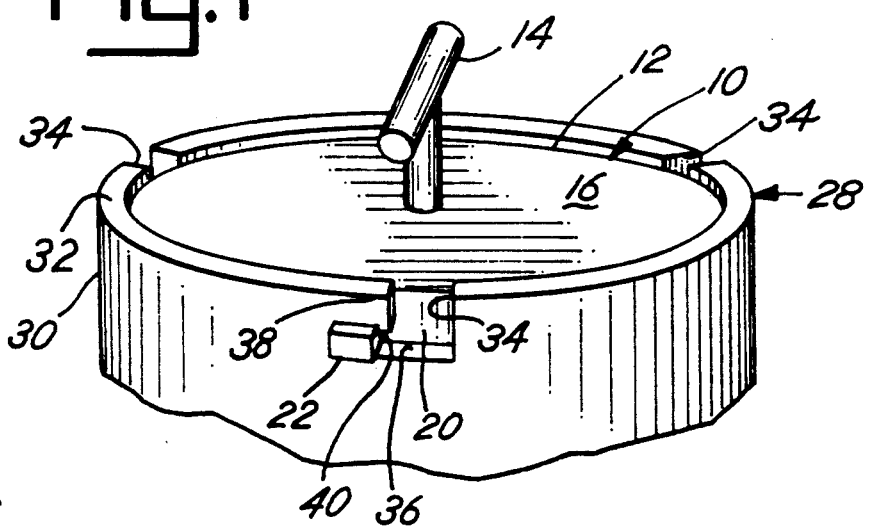
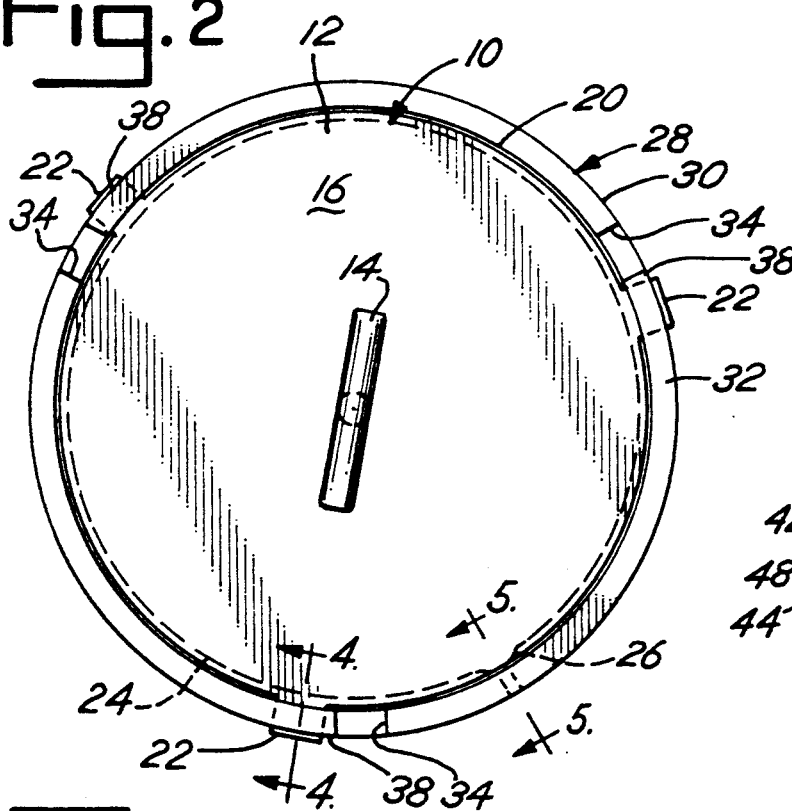
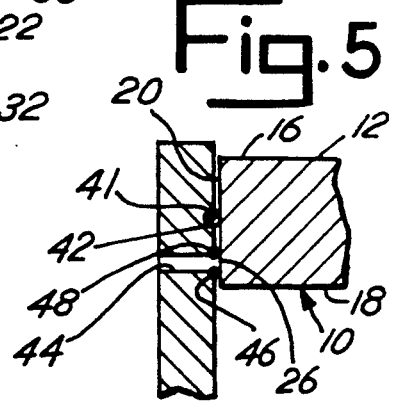
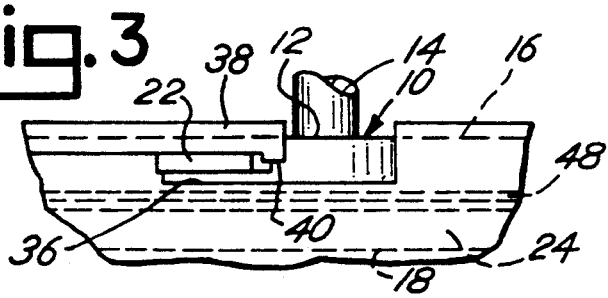
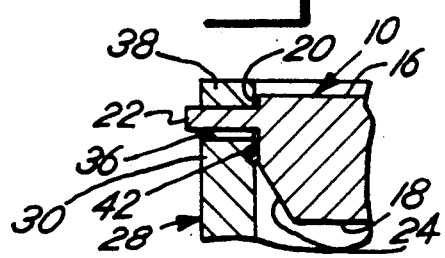

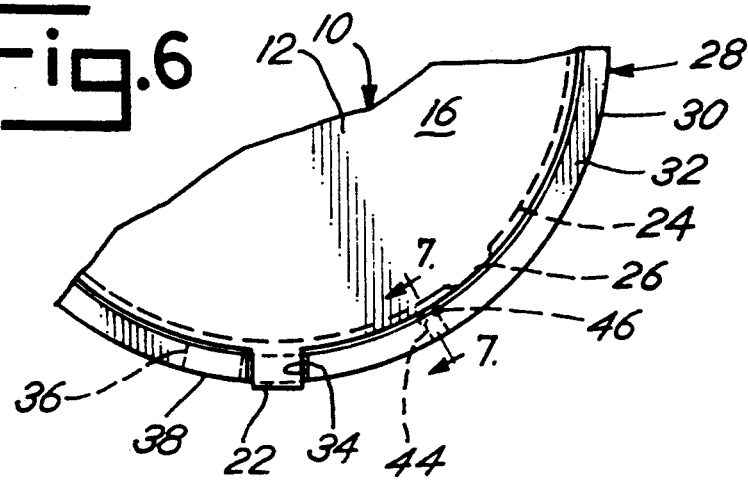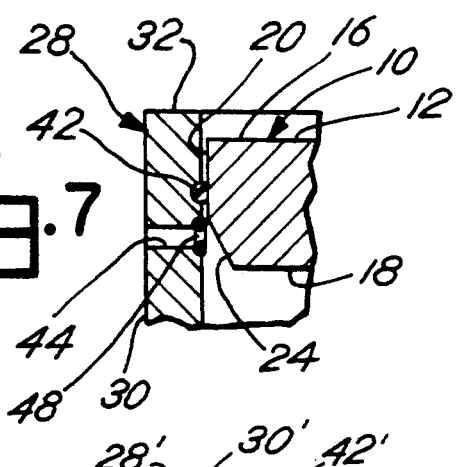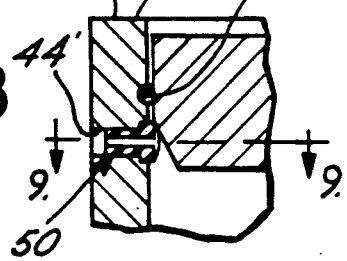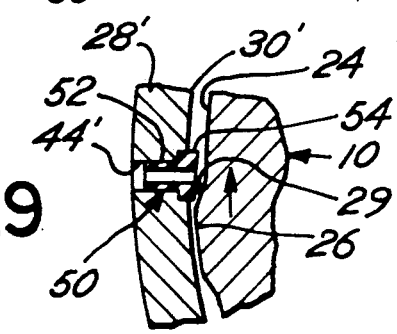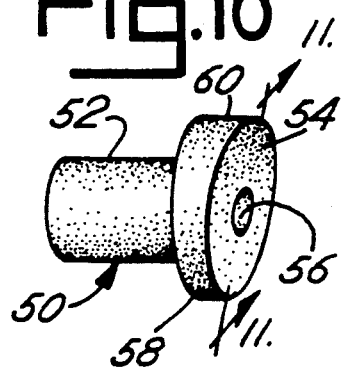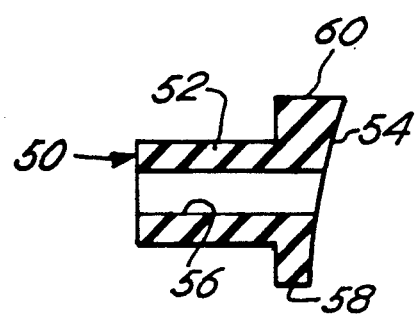

PRESSURE VESSEL

FIELD OF THE INVENTION

This invention relates to a pressure vessel and will have special application to a pressure vessel which incorporates a safety device to prevent premature sealing of the vessel as well as to vent residual pressure within the vessel prior to removal of the lid.

BACKGROUND OF THE INVENTION

Heretofore pressure vessel lids have been constructed with safety features such as bleeder valves and pressure sensitive latches to prevent over pressurization of the vessel as well as to prevent the opening of the lid while the vessel is pressurized. However, a problem arises when, due to user neglect, either a bleeder valve is not properly adjusted or the latch is not properly closed during pressurization. Upon such conditions, a tragic accident could occur after pressurization if the latch or bleeder valve, which was improperly adjusted, opens rapidly. Such an event could cause the vessel to disburse its liquid and injure people nearby.

SUMMARY OF THE INVENTION

The pressure vessel of this invention eliminates the above dangers by providing a vent and lock combination which includes a lid having fingers which engage notches formed in the housing side walls. The fingers and notches interlock to secure the lid to the housing. The housing has a side vent opening. A substantial portion of the lower edge portion of the lid is undercut or bevelled inwardly which, when aligned with the vent opening, allows residual pressure within the housing to be vented to the ambient surroundings. A portion of the lid's lower edge is not bevelled. As the lid is rotated from its open position to its fully closed and locked position, the unbevelled portion of the lid lower edge aligns with the vent opening and engages a seal about the vent opening to seal the vessel. Therefore, the vessel can only be pressurized after the lid has been safely secured to the vessel in a fully locked position. After substantial depressurization, the lid is rotated towards its open position. Before the lid is fully opened, the bevelled portion of the lid's lower edge aligns with the vent opening to vent residual pressure within the vessel before the fingers disengage the housing sidewall. The lid may then be fully rotated to its open position and then safely removed.

Accordingly, it is an object of this invention to provide for a user safe pressure vessel.

Another object of this invention is to provide for a pressure vessel which combines a lid locking mechanism mechanically connected to a vent.

Other objects of the invention become apparent upon a reading of the following description taken with the accompanying drawings.

BRIEF DESCRIPTION OF THE DRAWINGS

FIG. 1 is a perspective view of the pressure vessel with portions cut away to illustrate the lid attached to a vessel and housing and in the fully closed position.

FIG. 2 is a top view of the pressure vessel with the lid in a closed position.

FIG. 3 is a fragmented side elevational view of the pressure vessel with the lid in a closed position illustrating the engagement between a lid finger and the housing sidewall.

FIG. 4 is a fragmented cross-sectional view taken from lines 4—4 of FIG. 2.

FIG. 5 is a fragmented cross-sectional view taken of lines 5—5 of FIG. 2.

FIG. 6 is a fragmented top view of the pressure vessel with the lid in the open position.

FIG. 7 is a sectional view taken along line 7—7 of FIG. 6.

FIG. 8 is a cross-sectional view of the lid and vent opening in the closed position showing alternative embodiment of the vent seal.

FIG. 9 is a sectional view taken along lines 9—9 of FIG. 8.

FIG. 10 is a perspective view of the alternative embodiment for the vent seal of FIGS. 8 and 9.

FIG. 11 is a sectional view of the vent seal of FIG. 10.

DESCRIPTION OF THE PREFERRED EMBODIMENTS

The preferred embodiments herein disclosed are not intended to be exhaustive or to limit the invention to the precise forms disclosed. Rather, they are chosen and described to best explain the principles involved in the invention and to enable others skilled in the art to utilize its teachings.

The pressure vessel lid 10 shown in the figures includes a cover plate 12 and a T-shaped handle member 14 connected to the cover plate 12 to form a grip for the user. Plate 12 has a top face 16, a bottom face 18 and, a periphial side face 20. A plurality of integral fingers 22 extend radially outwardly from side face 20 of plate 12. Plate 12 has a bevelled lower side edge 24 which extends about a substantial portion of the periphery of side face 20. A portion 26 of the lower side edge of plate 12 is flush with side face 20. Portion 26 in essence forms a protrusion relative to the bevelled side edge portion 24 of the plate as shown in FIG. 2. Portion 26 is bevelled at each lateral edge 29 to form a smooth transition between, the portion and the bevelled side edge 24.

Vessel 28 includes a side wall 30 having an upper edge 32 to define a central opening. A plurality of notches 34 are formed in side wall 30 and extend downwardly from upper edge 32. Each notch 34 has a slot 36 extending laterally from notch 34 undercutting the upper edge 32 of side wall 30 to define a ledge 38. A nib 40 extends downwardly from ledge 38 adjacent notch 34 into slot 36. A groove 41 is formed about the interior surface of side wall 30 below notches 34 and accommodates O-ring seal 42. A vent hole 44 is defined through side wall 30 below groove 41 and O-ring 42. An annular groove 46 is defined in the interior surface of side wall 30 about vent hole 44 and accommodates O-ring seal 48.

In use, lid 10 is placed into the upper opening or mouth of vessel 28 with each finger 22 is positioned within a notch 34. As illustrated in the figures O-ring 42 contacts sidewall 20 of lid 10 in sealing engagement to seal the lid to the vessel. In this position, illustrated in FIG. 6, vent 44 and side edge portion 26 are radially offset or spaced from one another, and vent 44 is open to vent pressure buildup to the ambient surroundings. FIG. 7 illustrates the relationship between vent opening 44 and the bevelled portion 24 of the plate's lower edge when the lid 10 is in its open position (FIG. 6).

Lid 10 is rotated relative to vessel 28 from the position of FIG. 6 to cause fingers 22 to enter channels 36 until the fingers pass beneath and fully beyond nib 40.

With the fingers so positioned, portion 26 of lid 10 is in sealing engagement with O-ring 48 to seal the vent 44. FIGS. 2 and 5 reflect the sealing engagement of protrusion 26 and O-ring 48 when lid 10 is in the fully closed position. When lid 10 is in the fully closed position, the vessel is fully sealed to permit pressure to build within the vessel. When the vessel is pressurized, lid 10 raises under force of the pressure until fingers 22 contact the lower edge of ledge 38 as shown in FIG. 3. Nib 40 contacts fingers 22 when the vessel is pressurized to prevent rotation of the lid toward the open position of FIG. 6.

To remove the lid, after substantial depressurization of the vessel, lid 10 is rotated to move the fingers 22 under nib 40 and toward notch 34. Before fingers 22 are fully seated within notch 34, protrusion 26 of lid 10 is shifted from sealing engagement with O-ring 48 and residual pressure within the vessel is safely vented through vent 44. When fully depressurized, lid 10 may be rotated into the open position of FIG. 6 and removed.

FIGS. 8-11 illustrate a second embodiment of the pressure vessel 28' as including a seal 50 having a sleeve 52 and head 54 defining throughbore 56. Sleeve 52 is inserted into vent hole 44' such that the inner surface of head 54 contacts side wall 30'. As illustrated head 54 of seal 50 thickens with distance from front edge 58 toward rear edge 60. Seal 50 may be formed from any resilient material commonly used for seals or any other suitable material. In use as the lid is rotated into its closed position portion 26 engages head 54 of seal 50 and compresses the head against side wall 30. The engagement of portion 26 and head 54 seals vent hole 44' of vessel 28'.

It should be understood that the invention is not be limited to the precise details above but may be modified within the scope of the appended claims.

We claim:

1. A pressure vessel having a housing with an opening defined by a side wall and a lid, said lid spanning the opening of said housing, locking means associated with said lid and housing for securing said lid to said housing, said lid being rotatably shiftable relative to said housing between a closed position for engaging said locking means to secure said lid to said housing and an open position for disengaging said locking means to release said lid from said housing, safety means associated with said locking means for preventing pressurization of said housing, wherein said safety means is inactive to allow pressurization of said housing as said lid is shifted into its closed position, said safety means including a vent opening through said side wall, said lid including a side edge, a portion of said side edge constituting means for covering and sealing said vent opening as said lid is shifted into its said closed position.

2. The pressure vessel of claim 1 wherein said side edge of said lid is bevelled inwardly except for said side edge portion, said bevelled side edge being located spacedly over said vent opening when the lid is in its said open position to allow said housing to be vented through the vent opening.

3. The pressure vessel of claim 1 and an O-ring carried within an annular groove formed in said housing about said vent opening, said side edge portion contacting said O-ring when said lid is in its said closed position.

4. The pressure vessel of claim 1 and a seal including a head having an integral sleeve extending therefrom with a central bore formed through said sleeve and said head, said sleeve positioned within said vent opening such that said head contacts said housing, said head having a bevelled outer surface whereby said lid side edge portion compresses against said seal head bevelled outer surface as the lid is rotated into its said closed position.

5. A pressure vessel having a housing with an opening and a lid, said lid spanning the opening of said housing, locking means associated with said lid and housing for securing said lid to said housing, said lid being shiftable between a closed position for engaging said locking means to secure said lid to said housing and an open position for disengaging said locking means to release said lid from said housing, the improvement comprising safety means associated with said locking means for preventing pressurization of said housing, wherein said safety means is inactive to allow pressurization of said housing as said lid is shifted into its closed position, said safety means including a vent opening in said housing and a seal carried by said lid, said seal shiftable into a sealing relationship with said vent opening as said lid is shifted into its said closed position, a portion of a lower side edge of said lid being bevelled inwardly, said lid including a flattened lower side edge portion flush against said seal when the lid is in its said closed position, said seal including a head having an integral sleeve extending therefrom with a central bore formed through said sleeve and said head, said sleeve positioned within said vent opening such that said head contacts said housing, said head having a bevelled outer surface whereby said lid flattened portion compresses against said seal as the lid is rotated into its closed position.

* * * * *